US010488175B2

(12) United States Patent
Shaked et al.

(10) Patent No.: US 10,488,175 B2
(45) Date of Patent: Nov. 26, 2019

(54) MULTI WAVELENGTH MULTIPLEXING FOR QUANTITATIVE INTERFEROMETRY

(71) Applicant: Ramot at Tel-Aviv University Ltd., Tel Aviv (IL)

(72) Inventors: Natan Tzvi Shaked, Mazkeret Batya (IL); Nir Turko, Tel Aviv (IL)

(73) Assignee: RAMOT AT TEL-AVIV UNIVERSITY LTD., Tel Aviv (IL)

( * ) Notice: Subject to any disclaimer, the term of this patent is extended or adjusted under 35 U.S.C. 154(b) by 0 days.

(21) Appl. No.: 16/204,579

(22) Filed: Nov. 29, 2018

(65) Prior Publication Data
US 2019/0162520 A1    May 30, 2019

Related U.S. Application Data

(60) Provisional application No. 62/592,604, filed on Nov. 30, 2017.

(51) Int. Cl.
  *G01B 9/02*    (2006.01)
  *G01B 11/24*   (2006.01)
(52) U.S. Cl.
  CPC ..... *G01B 9/02047* (2013.01); *G01B 9/02007* (2013.01); *G01B 11/2441* (2013.01)
(58) Field of Classification Search
  CPC ............ G01B 11/2441; G01B 9/02027; G01B 9/02028; G01B 9/02032; G01B 9/02047; G01B 9/02049; G01B 9/02087
  See application file for complete search history.

(56) References Cited

U.S. PATENT DOCUMENTS

| | | | |
|---|---|---|---|
| 5,841,125 A | 11/1998 | Livingston | |
| 5,943,134 A | 8/1999 | Yamaguchi et al. | |
| 6,266,147 B1 | 7/2001 | Naulleau | |
| 6,351,307 B1 | 2/2002 | Erskine | |
| 9,574,868 B2 | 2/2017 | Shaked et al. | |

(Continued)

FOREIGN PATENT DOCUMENTS

EP    1148398 A2    10/2001

OTHER PUBLICATIONS

N. A. Turko, A. Peled, and N. T. Shaked, "Wide-field interferometric phase microscopy with molecular specificity using plasmonic nanoparticles," J. Biomed. Opt. 18(11), 111414 (2013).

(Continued)

*Primary Examiner* — Jonathan M Hansen
(74) *Attorney, Agent, or Firm* — Browdy and Neimark, PLLC

(57) ABSTRACT

The present invention relates to a new interferometric module which may be implemented as holographic/interferometric portable optical setups that are based on the interferometry with multiple wavelengths acquired simultaneously, without changing the imaging parameters, such as the magnification and the resolution, and recording the quantitative complex wave front (i.e. amplitude and phase) imaging in several wavelengths simultaneously. This may be used for multiple-wavelength phase unwrapping, for recording higher or optically thicker samples or for spectroscopic holography, without loss of camera frame rate due to wavelength scanning.

23 Claims, 7 Drawing Sheets
(6 of 7 Drawing Sheet(s) Filed in Color)

(56) References Cited

U.S. PATENT DOCUMENTS

| | | | |
|---|---|---|---|
| 10,330,463 | B2* | 6/2019 | Yang .................. G01B 11/162 |
| 2004/0121496 | A1 | 6/2004 | Brankner et al. |
| 2004/0212807 | A1 | 10/2004 | Hanson et al. |
| 2011/0242543 | A1 | 10/2011 | Wax et al. |
| 2012/0200901 | A1 | 8/2012 | Dubois et al. |
| 2012/0307035 | A1 | 12/2012 | Yaqoob et al. |
| 2013/0003073 | A1 | 2/2013 | Yu et al. |
| 2016/0265900 | A1* | 9/2016 | Yang .................. G01B 11/162 |
| 2016/0305761 | A1 | 10/2016 | Girshovitz et al. |
| 2018/0135970 | A1* | 5/2018 | Mazumdar ......... G06K 9/00288 |

OTHER PUBLICATIONS

J. Kühn, T. Colomb, E Montfort, F. Charriere, Y. Emery, E Cuche, P. Marquet, and C. Depeursinge, "Real-time dual-wavelength digital holographic microscopy with a single hologram acquisition," Opt. Express 15(12), 7231-7242 (2007).

H. Gabai and N. T. Shaked, "Dual-channel low-coherence interferometry and its application to quantitative phase imaging of fingerprints," Opt. Express 20, 26906-26912 (2012).

M. T. Rinehart, N. T. Shaked, N. J. Jenness, R. L Clark, and A. Wax, "Simultaneous two-wavelength transmission quantitative phase microscopy with a color camera," Opt Lett 35(15), 2612-2614 (2010).

D. G. Abdelsalam and D. Kim, "Real-time dual-wavelength digital holographic microscopy based on polarizing separation," Opt. Commun. 285(3), 233-237 (2012).

P. Girshovitz and N. T. Shaked, "Compact and portable low-coherence interferometer with off-axis geometry for quantitative phase microscopy and nanoscopy," Opt. Express 21(5), 5701-14 (2013).

P. Girshovitz and N. T. Shaked, "Doubling the field of view in off-axis low-coherence interferometric imaging," Light Sci. Appl. 3(3), e151 (2014).

S. Chowdhury, W. J. Eldridge, A. Wax, and J. A. Izatt, "Spatial frequency-domain multiplexed microscopy for simultaneous, single-camera, one-shot, fluorescent, and quantitative-phase imaging," Opt. Lett. 40(21), 4839-4842 (2015).

Christopher J. Mann, P. R. Bingham, V. C. Paquit and K. W. Tobin; Quantitative phase imaging by three-wavelength digital holography; Optics Express vol. 16, No. 13.

I. Frenklach, P. Girshovitz, and N. T. Shaked, "Off-axis interferometric phase microscopy with tripled imaging area," Opt. Lett. 39, 1525-1528 (2014).

P. Girshovitz, I. Frenklach, and N. T. Shaked, "Broadband quantitative phase microscopy with extended field of view using off-axis interferometric multiplexing," J. Biomed. Opt. 20, 111217 (2015).

P. Girshovitz and N. T. Shaked, "Real-time quantitative phase reconstruction in off-axis digital holography using multiplexing," Opt. Lett. 39(8):2262-2265 (2014).

D. Roitshtain, N. Turko, B. Javidi, and N. T. Shaked, "Flipping interferometry and its application for quantitative phase microscopy in a micro-channel," Opt. Lett. 41, 2354-2357 (2016).

Guo, R., et al. 2011. "Reflective point-diffraction microscopic interferometer with long-term stability", Chinese Optics Letters, 9(12): 120002-1-120002-3. XP055219412.

Bhaduri, B., et al. 2012. "Diffraction phase microscopy with white light", Optics Letters, 37(6): 1094-1096. XP001574573.

Gao, P., et al. 2011. "Parallel two-step phase shifting point-diffraction interferometry for microscopy based on a pair of cube beamsplitters", Optics Express, 19(3): 1930-1935. XP055219411.

Shaked, Natan T. et al. "Reflective interferometric chamber for quantitative phase imaging of biological sample dynamics", Journal of Biomedical Optics Letters. 15:3: 030503-1-030503-3 (May/Jun. 2010).

Popescu, Gabriel et al. "Diffraction phase microscopy for quantifying cell structure and dynamics", Optics Letters, 31:6: 775-777 (Mar. 2006).

Ding, Huafeng et al "Instantaneous spatial light interference microscopy", Optics Express, 18:2: 1569-1575 (Jan. 2010).

Jang, Jaeduck et al. "Self-reference quantitative phase microscopy for microfluidic devices", Optics Letters, 35:4: 514-516. (Feb. 2010).

Kemper Bjorn et al "Simplified approach for quantitative digital holographic phase contrast imaging of living cells", Journal of Biomed Optics, 16:2: 026014-1-026014-4. (Feb. 2011).

Shaked, Natan T. et al "Quantitative microscopy and nanoscopy of sickle red blood cells performed by wide field digital Interferometry", Journal of Biomedical Optics, 16:3: 030506-1-030506-3 (Apr. 2011).

Mico, Vincente et al "Common-path phase-shifting digital holographic microscopy: a way to quantitative phase imaging and superresolution", Optics Letters, 35(23):3919-3921 (2010).

Bon, Pierre et al "Quadriwave lateral shearing interferometry for quantitative phase microscopy of living cells", Optics Express, 17:15: 13080-13094. (Jul. 2009).

Lee, Myungjun et al. "Field-portable reflection and transmission microscopy based on lensless holography", Biomedical Optics Express, 2:9: 2721-2730 (Sep. 2011).

Kolman, Pavel et al "Coherence-controlled holographic microscope", Optics Express, 18:21: 21990-22003 (Oct. 2010).

Monemhaghdoust et al. "Dual wavelength full field imaging in low coherence digital holographic microscopy", Optics Express, 19:24: 24005-24022 (Nov. 2011).

Wang, Zhuo et al "Spatial light interference microscopy (SLIM)", Optical Express, 19:2: 1016-1026 (Jan. 2011).

Shaked, T. Natan T et al. "Parallel on-axis holographic phase microscopy of biological cells and unicellular microorganism dynamics" Applied Optics, 49:15: 2872-2878 (May 2010).

Shock, Itay et al. "Optical phase measurements in red blood cells using low-coherence spectroscopy", Journal of Biomedical Optics, 17:10: 101509-1-10509-5 (Oct. 2012).

Liu, C., et al. 2002. "Super-resolution digital holographic imaging method", Applied Physics Letters, 81(17): 3143-3145. XP012032246.

Paturzo M., et al. 2009. "Investigation of angular multiplexing and de-multiplexing of digital holograms recorded in microscope configuration", Optics Express, 17(11): 8709-8718. XP007912148.

Wang, et al., Pulsed digital holography system recording ultrafast process of the femtosecond order, Optics Letters, Jun. 2006, pp. 1636-1638, vol. 31, No. 11.

Ferraro, et al., Quantitative Phase Microscopy of microstructures with extended measurement range and correction of chromatic aberrations by multiwavelength digital holography, Optics Express, Oct. 2007, pp. 14591-14600, vol. 15, No. 22.

Gabolde, et al., Single-shot measurement of the full spatio-temporal field or ultrashort pulses with multi-spectral ligital holography, Optic Express, Nov. 2006, pp. 11460-11467, vol. 14, No. 23.

Girshovitz, et al., Generalized cell morphological parameters based on interferometric phase microscopy and their application to cell life cycle characterization, Biomedical Optics Express, Aug. 2012, pp. 1757-1773, vol. 3, No. 8.

Mico, et al., Superresolution digital holographic microscopy for three-dimensional samples, Optics Express, Nov. 2008, pp. 19260-19270, vol. 16, No. 23.

Paturzo, et al., Super-resolution in digital holography by a two-dimensional dynamic phase grating, Optics Express, Oct. 2008, pp. 17107-17118, vol. 16, No. 21.

Shaked, Natan T., Quantitative phase microscopy of biological samples using a portable interferometer, Optics Letters, Jun. 2012, pp. 2016-2018, vol. 37, No. 11.

Uttam, et al., Optically multiplexed imaging with superposition space tracking, Optics Express, Feb. 2009, pp. 1691-1713, vol. 17, No. 3.

Mico, Vincente et al "Common-path phase-shifting digital holographic microscopy: a way to quantitative phase imaging and superresolution", Optics Communications, 281:17: 4273-4281 (Apr. 2008).

* cited by examiner

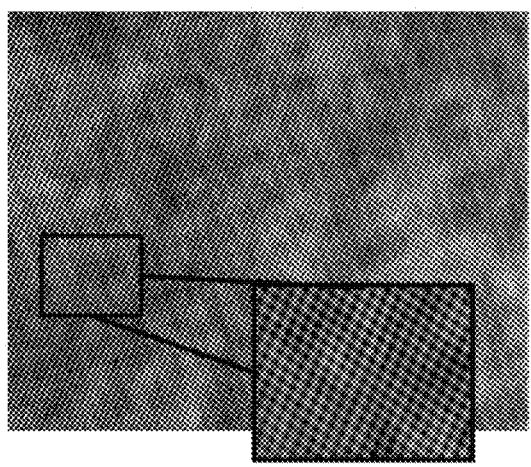 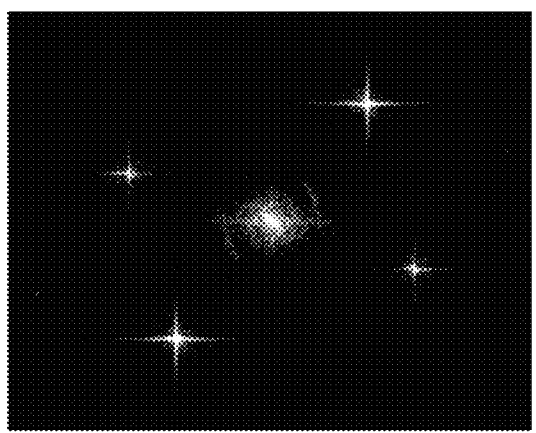
Fig. 2A                    Fig. 2B

MULTI WAVELENGTH MULTIPLEXING FOR QUANTITATIVE INTERFEROMETRY

TECHNOLOGICAL FIELD

The present invention relates to an off-axis interferometric module, a sample inspection system and a method for multi-wavelength multiplexing for quantitative interferometric imaging.

BACKGROUND ART

References considered to be relevant as background to the presently disclosed subject matter are listed below:
1. N. A. Turko, A. Peled, and N. T. Shaked, "Wide-field interferometric phase microscopy with molecular specificity using plasmonic nanoparticles," J. Biomed. Opt. 18(11), 111414 (2013).
2. J. Kühn, T. Colomb, F. Montfort, F. Charriere, Y. Emery, E. Cuche, P. Marquet, and C. Depeursinge, "Real-time dual-wavelength digital holographic microscopy with a single hologram acquisition," Opt. Express 15(12), 7231-7242 (2007).
3. H. Gabai and N. T. Shaked, "Dual-channel low-coherence interferometry and its application to quantitative phase imaging of fingerprints," Opt. Express 20, 26906-26912 (2012).
4. M. T. Rinehart, N. T. Shaked, N. J. Jenness, R. L. Clark, and A. Wax, "Simultaneous two-wavelength transmission quantitative phase microscopy with a color camera," Opt Lett 35(15), 2612-2614 (2010).
5. D. G. Abdelsalam and D. Kim, "Real-time dual-wavelength digital holographic microscopy based on polarizing separation," Opt. Commun. 285(3), 233-237 (2012).
6. P. Girshovitz and N. T. Shaked, "Compact and portable low-coherence interferometer with off-axis geometry for quantitative phase microscopy and nanoscopy," Opt. Express 21(5), 5701-14 (2013).
7. P. Girshovitz and N. T. Shaked, "Doubling the field of view in off-axis low-coherence interferometric imaging," Light Sci. Appl. 3(3), e151 (2014).
8. S. Chowdhury, W. J. Eldridge, A. Wax, and J. A. Izatt, "Spatial frequency-domain multiplexed microscopy for simultaneous, single-camera, one-shot, fluorescent, and quantitative-phase imaging," Opt. Lett. 40(21), 4839-4842 (2015).
9. US patent publication No. 2016/0305761.
10. Christopher J. Mann, P. R. Bingham, V. C. Paquit and K. W. Tobin; Quantitative phase imaging by three-wavelength digital holography; OPTICS EXPRESS Vol. 16, No. 13.
11. I. Frenklach, P. Girshovitz, and N. T. Shaked, "Off-axis interferometric phase microscopy with tripled imaging area," Opt. Lett. 39, 1525-1528 (2014).
12. P. Girshovitz, I. Frenklach, and N. T. Shaked, "Broadband quantitative phase microscopy with extended field of view using off-axis interferometric multiplexing," J. Biomed. Opt. 20, 111217 (2015).
13. P. Girshovitz and N. T. Shaked, "Real-time quantitative phase reconstruction in off-axis digital holography using multiplexing," Opt. Lett. 39, 2262-2265 (2014).
14. D. Roitshtain, N. Turko, B. Javidi, and N. T. Shaked, "Flipping interferometry and its application for quantitative phase microscopy in a micro-channel," Opt. Lett. 41, 2354-2357 (2016).

Acknowledgement of the above references herein is not to be inferred as meaning that these are in any way relevant to the patentability of the presently disclosed subject matter.

BACKGROUND

Interferometric phase microscopy, also called digital holographic microscopy, provides quantitative optical thickness measurements for biological studies [1] and high-accuracy profiling in metrology and surface inspection. In this technique, the quantitative phase of the light interacting with the sample is reconstructed from an interferogram of the sample. The phase acquired is proportional to the surface topography for a reflective sample or to the integral refractive index for a transparent sample. Simultaneous multi-wavelength interferometric acquisition is highly relevant for dynamic samples that do not allow multiple acquisitions. For multi-wavelength phase unwrapping, since the phase of light is $2\pi$ periodic, objects that are optically thicker than the illumination wavelength are wrapped and subject to phase measurement ambiguity. A 2D phase unwrapping algorithm can be digitally applied to obtain continuous phase reconstruction. These algorithms, however, have two major drawbacks; they are computationally demanding, and they fail when a large phase discontinuity is encountered, such as in steep steps or sharp refractive-index variations.

Alternatively, a system-based solution to the phase ambiguity problem is two-wavelength interferometry. Using this technique, two interferograms with different illumination wavelengths are acquired, and the wrapped phase profile is extracted from each of them separately. Then, by simple processing, as described later, a new phase map with a large synthetic wavelength is obtained, significantly increasing the unambiguous phase range [2-3]. Since two different interferograms are needed per each sample instance, the acquisition should be faster than the sample dynamics.

A more general solution is simultaneous dual-wavelength interferometric acquisition. In 2007, Kühn et al. [2] used simultaneous two-wavelength holography by multiplexing two beams of different wavelengths on the same sensor, providing real-time holographic capabilities. Their system was based on two Mach-Zehnder interferometers, built around the sample, creating two separate reference beam paths, one for each wavelength, so that on the camera they obtained two off-axis interferograms of the sample simultaneously, with 90°-rotated fringe direction in relation to each other. Other methods for separating the two wavelengths in simultaneous dual-wavelength interferometry include using a color Bayer-mosaic camera [4] and polarization [5]. However, all of these methods require two separate reference beams, which are independent of the sample on most of the optical path. These setups are prone to mechanical noise, as all three beams may not be subjected to the same vibrations. Specifically, when creating a large synthetic wavelength, the result has further increased sensitivity to noise. In parallel to dual-wavelength interferometry, self-interference interferometric techniques have been developed [6], allowing more stable systems with a decreased temporal phase noise due to nearly common-path interferometric geometry. In these systems, both the reference and the sample beams are formed from the image of the sample itself. The reference beam can be generated externally, after the output image plane of the optical system, from a spatially filtered version of the image, effectively erasing the sample spatial modulation from one of the beams, while the off-axis interference is realized by a retroreflector [6] or a diffraction grating. These setups not only increase the temporal stability of the system, they also make it less complex, and more portable and compact, since they are external to the imaging system and not built around the sample.

An external interferometric module designed to allow doubling of the imaged field of view has been proposed [7]. Two beam splitters and two retro-reflectors were used to create a multiplexed off-axis interferogram, containing two fields of view of the sample at once, each of which was encoded into another interference fringes direction. Since the fringe directions were orthogonal, both fields of view could be retrieved, thus doubling the imaged area of the sample, while sharing the dynamic range of the camera in the acquired multiplexed hologram. This idea has recently been extended to multiplexing interferometric phase images and interferometric fluorescence images with simultaneous acquisition [8].

Off-axis holography allows reconstruction from a single camera exposure, by inducing a small angle between the sample and reference beams creating the interference pattern of the hologram. This is possible since in the spatial frequency domain, there is a full separation between the auto-correlation terms and each of the cross-correlation terms, each of which contains the complex wave front of the sample. This separation is typically across a single axis, which allows compressing more information on the other axes as well. This enables optical multiplexing of several holograms within a single multiplexed hologram and full reconstruction of the data. Each hologram can contain additional data of the imaged sample, meaning that multiplexing allows recoding more information with the same amount of camera pixels. This can be beneficial for highly dynamic samples. The inventors of the present invention have previously presented the technique of off-axis interferometry with doubled imaging area (IDIA) [7, 11, 12], in which several off-axis interferometric images are compressed into a single camera image and gain extended field of view. In this case, creation of the multiplexed hologram, recorded by the camera in a single exposure, is done by an external interferometric module, projecting onto the camera one reference beam and two or three sample beams at once (i.e. simultaneously).

US patent application No. 2017/003650 describes techniques, apparatus, material and systems for a portable camera device which can be attached to the camera port of a conventional transmission or reflection microscope for complex wave front analysis. At least one holographic element (BS, grating) splits the beam(s) containing the sample information in two beams (r,o) and filters (r',o') them.

GENERAL DESCRIPTION

The present invention presents a new interferometric module with important relevant metrology applications, such as silicon wafer nondestructive optical inspection with significantly extended depth measurement capabilities, and label-free biological cell spectroscopic imaging. Possible applications include simultaneous multi-wavelength phase unwrapping for increased thickness range, optical spectroscopy of the sample, and refractive index measurements of dynamic samples including decoupling between the sample refractive index and thickness in the phase measured. The interferometric module of the present invention may be implemented as holographic/interferometric portable optical setups that are based on the interferometry with multiple wavelengths acquired simultaneously to increase the unambiguous range of standard interferometric measurements or to perform holographic spectral analysis, without changing the imaging parameters, such as the magnification and the resolution, and recording the quantitative complex wave front (i.e. amplitude and phase) imaging of higher or optically thicker samples without loss of camera frame rate due to wavelength scanning. Using this interferometric module, it is possible to overcome the common problems of multi-wavelength interferometric setups of cross-talk, and complex and non-portable design.

Therefore, there is provided an off-axis interferometric module comprising a light directing optical arrangement for directing light to an optical detector, wherein the light directing optical arrangement is configured for defining at least two substantially overlapping optical paths towards the optical detector. The light directing optical arrangement comprises (a) at least one wavelength selective filter, configured for receiving a multiple-wavelength light beam having a modulated complex wave front and having at least two spectral bandwidths and separating the multiple-wavelength modulated beam into at least two wavelength-separated beams, each defining N different wavelength channels; (b) at least two reflecting surfaces defining a certain angle with respect to each other and positioned at the output of the wavelength selective filter; each reflecting surface being configured for receiving and rotating each wavelength-separated beam of each wavelength channel at a certain angle and back reflecting each wavelength-separated beam towards the detector through a beam combiner being configured for receiving and combining reflections of each wavelength-separated beam with a reference beam to produce at least two output combined beams propagating along the at least two substantially overlapping optical paths; the at least two output combined beams being thereby at least two off-axis overlapping interferograms to be optically multiplexed into a single off-axis interferogram, containing interference fringe orientation in different directions. N is an integer number having a value between two to six. The certain angle between the reflecting surfaces is selected to thereby control the off-axis interference.

In some embodiments, the off-axis interferometric module comprises an optical detector for simultaneously acquiring the at least two off-axis overlapping interferograms each at a different wavelength comprising an interference pattern resulting from interaction of the reference beam and at least one wavelength-separated in the image plane being thereby indicative of the modulated complex wave front, such that the interferometric module is configured and operable to reconstruct the sample phase profile using a single interferogram exposure.

In this connection, it should be noted that, in some embodiments of the present invention in which in the specific case of N equal to six (i.e. six different wavelength channels are defined), the novel off-axis interferometric module enables to present a new holographic concept in which six off-axis holograms are compressed into a multiplexed off-axis hologram without loss of magnification or resolution. The multiplexed hologram contains straight off-axis fringes with six different orientations, and can be generated optically or digitally. Since the six different complex wave fronts do not overlap in the spatial-frequency domain, they can be fully reconstructed. The six-pack holography allows more than 50% improvement in the spatial bandwidth consumption when compared to the best multiplexing method proposed so far. This six-pack holography concept is useful for a variety of applications, such as field of view multiplexing, wavelength multiplexing, temporal multiplexing, multiplexing for super-resolution imaging, and others.

In some embodiments, the interferometric module may be implemented as a dual-wavelength external holographic microscopy module for quantitative phase imaging of 3D structures with extended thickness range. The quantitative phase of the light interacting with the sample is reconstructed from an interferogram of the sample. In this specific and non-limiting example, this can be done by simultaneous acquisition of two off-axis interferograms, each at a different wavelength, and using the two measurements for generation of a synthetic wavelength, which is larger than the sample optical thickness, allowing two-wavelength phase unwrapping and thus measurement of deeper and more steep samples such as contacts in silicon wafers. The simultaneous acquisition may be carried out by using optical multiplexing of the two interferograms of two wavelength channels onto the camera, where each of them has orthogonal off-axis interference fringe direction in relation to the other one. Therefore in some embodiments, the invention provides simultaneous two-wavelength phase unwrapping using an external interferometric module for multiplexing off-axis holography.

Alternatives embodiments include the use of more than two wavelengths, in a manner that enables significant noise reduction. It is also possible to use four different wavelengths simultaneously, where the same idea can be extended to multiplex up to six wavelengths together. The novel invention provides a modularity of the optical interferometric module and a lack of crosstalk between wavelength channels.

In some embodiments, for N different wavelength channels, the off-axis interferometric module comprises N−1 wavelength selective filters.

In some embodiments, the off-axis interferometric module further comprises a holographic element positioned upstream to the wavelength selective filter for receiving the multiple-wavelength modulated beam, and splitting the multiple-wavelength modulated beam into at least two multiple-wavelength modulated beams. The holographic element may be selected from a beam splitter/combiner, a diffraction grating, a semi-transparent mirror, or a wavelength selective filter.

In some embodiments, the off-axis interferometric module further comprises an additional reflective surface, positioned in a first optical path of the at least two substantially overlapping optical paths, downstream to the wavelength selective filter, for receiving the reference multiple-wavelength modulated beam and reflecting the reference multiple-wavelength modulated beam towards the detector.

In some embodiments, the off-axis interferometric module further comprises a spatial filter, positioned in a second optical path of the at least two substantially overlapping optical paths downstream to the beam combiner for receiving from the beam combiner a multiple-wavelength modulated beam and spatially filtering the multiple-wavelength modulated beam to thereby create a reference multiple-wavelength modulated beam. The spatial filter may comprise a pinhole and may be configured to include a plurality of openings for allowing passage of back reflected reference beams.

In some embodiments, the at least two reflecting surfaces comprise two 90°-rotated titled mirrors such that each wavelength channel creates an orthogonal off-axis interference fringe direction with respect to the other wavelength channel.

According to another broad aspect of the present invention, there is provided a sample inspection system, comprising (a) light collecting and focusing optics configured and operable for collecting an input beam from a predetermined sample surface and focusing it onto an image plane; (b) a light source illuminating the sample surface; and (c) an off-axis interferometric module accommodated in a path of the light collected by the light collecting and focusing optics, and being connected at the output of the light collecting and focusing optics; the off-axis interferometric module being as defined above.

The invention may be thus a portable module that attaches to a regular microscope a coherent or partially coherent illuminated scene, and enables the microscope to record off-axis holograms of several wavelengths simultaneously. Thus, in some embodiments, the light collecting and focusing optics comprises a microscope. The recorded data can be used for various analyses. This interferometric module effectively increases frame rate and eliminates multiple segmentation issues that may be caused by movement of the sample during sequential frame capture with different wavelengths. Another application of the data is spectroscopic analysis of the holograms, which may be useful for rapid cell classification and disease detection based on blood cell spectral analysis. The invention may provide an interferometric module which increases the acquired data of the microscopy unit by either spectroscopic digital holography or extended height measurement capabilities, during off-axis holographic imaging. Other applications that require multi-wavelength interferometric and/or complex wave front acquisition are possible as well, using the new interferometric module of the present invention.

In some embodiments, the off-axis interferometric module is positioned to locate an image plane of the off-axis interferometric module on the detector such that the multiplexed interferogram contains at least two overlapping images acquired simultaneously in a single detector exposure.

In some embodiments, the sample inspection system further comprises a control unit configured and operable to receive from the detector a multiplexed interferogram composed of at least two fringe directions, each belonging to a different wavelength channel, and processing the multiplexed interferogram to provide at least two-wavelength phase unwrapping. The control unit may extract from the multiplexed interferogram at least two wrapped phase profiles associated with at least two wavelength channels. The control unit may also provide a 3D height map of the sample and/or its spectral dependency.

According to another broad aspect of the present invention, there is provided a method for multiple wavelength multiplexing comprising the following steps: (a) separating a multiple-wavelength beam being indicative of an image of a sample and having at least two spectral bandwidths into at least two wavelength-separated beams, each defining N different wavelength channels; (c) creating a reference multiple-wavelength modulated beam, and rotating each wavelength-separated beam of each wavelength channel at a certain angle and reflecting each wavelength-separated beam with an off-axis angle on a detector; (d) simultaneously projecting at least two image plane amplitude and phase modulated beams of each wavelength-separated beam onto a detector; (e) combining reflections of each wavelength-separated beam with a reference multiple-wavelength modulated beam to produce at least two output combined beams propagating along the at least two substantially overlapping optical paths; the at least two output combined beams being thereby at least two off-axis overlapping interferograms to be optically multiplexed into a single off-axis interferogram containing interference fringe orientation in different directions; and (f) acquiring a single multiplexed interferogram simultaneously from at least two wavelength channels in a single detector exposure.

In some embodiments, the method further comprises splitting the multiple-wavelength beam into first and second multiple-wavelength modulated beams spatially filtering a multiple-wavelength modulated beam to thereby create a reference multiple-wavelength beam with respect to the first multiple-wavelength modulated beam and reflecting the first multiple-wavelength modulated beam towards a detector.

In some embodiments, the method further comprises simultaneously acquiring up to six off-axis interferograms, each at a different wavelength.

In some embodiments, the method further comprises controlling the off-axis interference by controlling at least one of the interfering wave angles by the position of optical elements, configured for rotating each beam of the wavelength channels.

In some embodiments, the method further comprises creating different interference fringe direction between at least two wavelength channels, without overlap in the spatial-frequency domain.

In some embodiments, the method further comprises illuminating a sample surface with an illumination beam having at least two spectral bandwidths.

In some embodiments, the method further comprises collecting an input beam from a predetermined sample surface and projecting it onto an image plane.

BRIEF DESCRIPTION OF THE DRAWINGS

The patent or application file contains at least one drawing executed in color. Copies of this patent or patent application publication with color drawings will be provided by the Office upon request and payment of the necessary fee.

In order to better understand the subject matter that is disclosed herein and to exemplify how it may be carried out in practice, embodiments will now be described, by way of non-limiting example only, with reference to the accompanying drawings, in which:

FIG. 2A shows a multiplexed dual-wavelength interferogram, acquired by using one possible implementation of the interferometric module of the present invention;

FIG. 2B shows a power spectrum of the multiplexed interferogram, as obtained by a digital 2D Fourier transform;

FIG. 3A shows two-wavelength phase profile cross-sections for a 7.96-μm-high step target; FIG. 3B shows an unwrapped phase cross-section, as obtained for the step target by using two-wavelength phase unwrapping; FIG. 3C shows a histogram of the height measurements for the step target; FIG. 3D shows a height-map 3D rendering for the step target; FIG. 3E shows a height-map 3D rendering for a 30.5-μm-high copper pillar;

DETAILED DESCRIPTION OF EMBODIMENTS

Figure 1A:
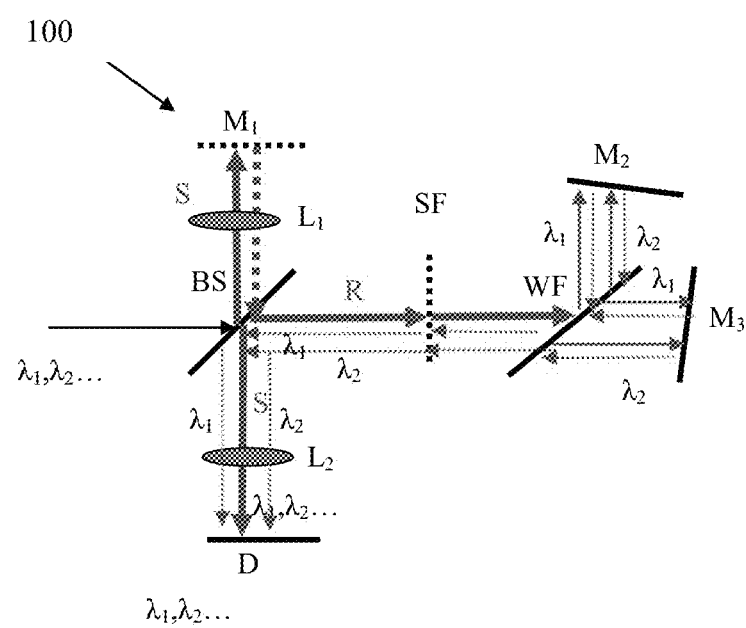
FIG. 1A is a schematic diagram of an interferometric module in accordance with embodiments of the present disclosure.

FIG. 1A shows a schematic view of the off-axis interferometric module 100 of the present invention. Off-axis interferometric module 100 comprises comprising a light directing optical arrangement for directing light to an optical detector D, wherein the light directing optical arrangement is configured for defining at least two substantially overlapping optical paths towards optical detector D. The light directing optical arrangement comprises inter alia an holographic element being illustrated in the figure as a beam splitter/combiner BS for receiving a multiple-wavelength light beam having a modulated complex wave front (i.e. amplitude and phase), being indicative of an image of a sample, and having at least two spectral bandwidths referred to as $\lambda_1, \lambda_2$ and splitting the multiple-wavelength modulated beam into first and second multiple-wavelength modulated beams referred to as S beam (blue arrow) and R beam (red arrow). As described above, the present invention is not limited to the use of a beam splitter/combiner BS and other light splitting and combining elements such as diffraction grating, a semi-transparent mirror, or a wavelength selective filter are also possible. In this specific and non-limiting example, the light directing optical arrangement also comprises a wavelength selective filter WF, configured for receiving the second multiple-wavelength modulated R beam and spectrally and spatially separating the second multiple-wavelength modulated R beam into two pairs of wavelength-separated beams, each pair defining N different wavelength channels $\lambda_1, \lambda_2 \ldots$ . The two wavelength-separated beams of the same wavelength channel are spatially separated in two different directions. The wavelength selective filter WF may be implemented as a dichroic reflecting surface or any type of color filter (dichroic filter). For the sake of simplicity, only two wavelength channels are represented, however, it should be noted that the invention is not limited to two wavelength channels, as will be illustrated further below. The number of wavelength selective filters present in the off-axis interferometric module depends on the number of wavelength channels desired for a specific sample. More specifically, for N different wavelength channels, the off-axis interferometric module comprises N−1 wavelength selective filters. In the present example in which two wavelength channels are represented, one wavelength selective filter is needed. The light directing optical arrangement also comprises at least two reflecting surfaces $M_2$ and $M_3$ defining a certain angle with respect to each other and positioned at the output of the at least one wavelength selective filter WF. Each one of the reflecting surfaces is tilted and therefore is configured for rotating each beam of each wavelength channel. It may be implemented by a mirror, retro-reflector or diffraction grating. In the present example in which two wavelength channels are represented, only two reflecting surfaces $M_2$ and $M_3$ are needed. Each tilted reflecting surface $M_2$ and $M_3$ is thus configured for receiving and rotating each wavelength-separated beam $\lambda_1$, $\lambda_2$ of each wavelength channel at a certain angle and back reflecting each wavelength-separated beam towards the detector D through the beam splitter/combiner BS. The beam splitter/combiner unit BS is further configured for receiving and combining reflections of each wavelength-separated beam $\lambda_1$, $\lambda_2$ with the first multiple-wavelength modulated S beam to produce at least two output combined beams propagating along the at least two substantially overlapping optical paths. The at least two output combined beams are thereby at least two off-axis overlapping interferograms to be optically multiplexed into a single off-axis interferogram containing interference fringe orientation in different directions that allow full separation in the spatial-frequency domain. The optical detector D is configured for simultaneously acquiring the at least two off-axis overlapping interferograms each at a different wavelength comprising an interference pattern resulting from interaction of the first and second beams in the image plane being thereby indicative of the complex wave front modulation, such that the interferometric module is configured and operable to reconstruct the sample phase profile using a single interferogram exposure.

The light directing optical arrangement may also comprise an additional reflective surface $M_1$, positioned in the first optical path of the first multiple-wavelength modulated S beam, downstream to beam splitter BS with respect to the optical path of the light propagation. Additional reflective surface $M_1$ is configured for receiving the first multiple-wavelength modulated S beam and reflecting the first multiple-wavelength modulated S beam towards detector D through beam splitter/combiner BS. The light directing optical arrangement may also comprise a spatial filter SF, positioned in the second optical path of the second multiple-wavelength modulated R beam downstream to beam splitter/combiner BS with respect to the optical path of the light propagation. Spatial filter SF is configured for receiving from the beam splitter BS the second multiple-wavelength modulated R beam and spatially filtering the second multiple-wavelength modulated R beam to thereby create a reference multiple-wavelength modulated beam with respect to the first multiple-wavelength modulated S beam.

Figure 1B:
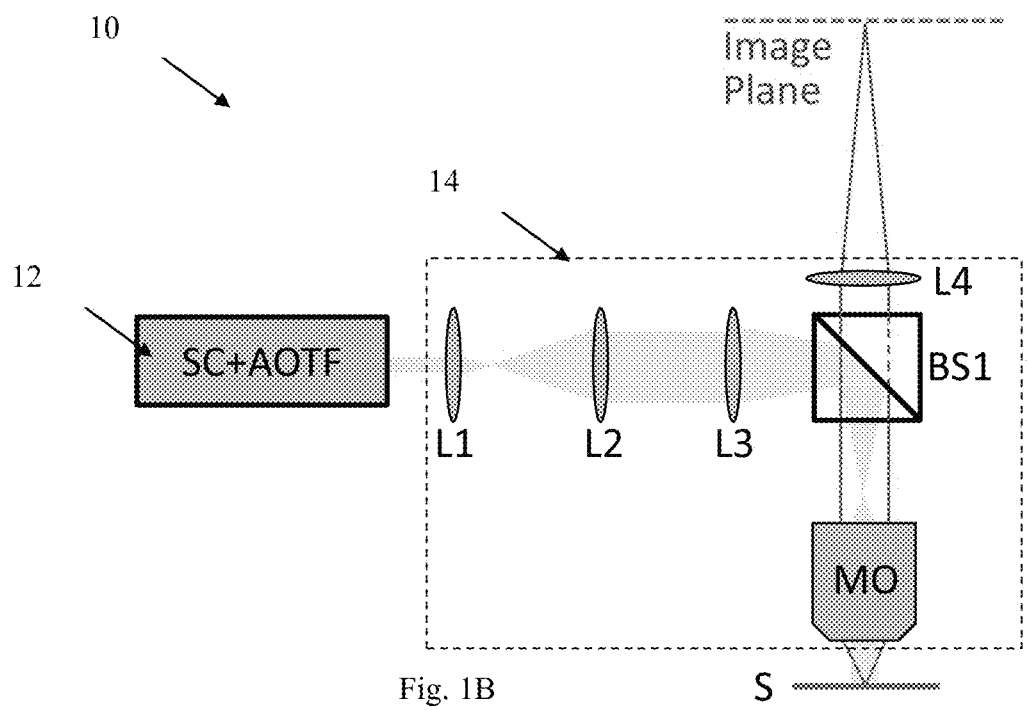
FIGS. 1B-1C are schematic diagrams of possible sample inspection systems in accordance with embodiments of the present disclosure.

FIG. 1B shows one specific and non-limiting example of a simplified imaging set up in which the interferometric module of the present invention may be included. In this non-limiting example, the sample inspection system 10 comprises an light collecting and focusing optics 14 illuminated by an illumination source 12 e.g. supercontinuum source (SC400-4; Fianium), connected to an acousto-optical tunable filter (SC-AOTF, Fianium), which is configured for creating two simultaneous spectral bandwidths of different wavelengths $\lambda_1$ and $\lambda_2$. For example, the two simultaneous spectral bandwidths may have different wavelengths $\lambda_1=580$ nm, $\lambda_2=597$ nm, or alternatively $\lambda_1=580$ nm, $\lambda_2=605$ nm, all with spectral bandwidth of approximately 5.4 nm. The light collecting and focusing optics 14 may comprise a beam expander (e.g. lenses L1, f=50 mm and L2, f=400 mm) expanding the illumination beam emitted by source 12, which can be followed by a 4-f lens configuration (e.g. lens L3, f=200 mm) a beam splitter BS1, and a reflectance microscope MO, (e.g. 20×, 0.4 NA) such that the illumination beam propagates towards a sample S. After being reflected from the sample S, the same microscope objective MO may magnify the image and project it through a tube lens (e.g. L4, f=200 mm) on the image plane of the microscope, where interferometric module of the present invention is attached. In other words, interferometric module may be connected to the output of the light collecting and focusing optics 14.

Figure 1C:
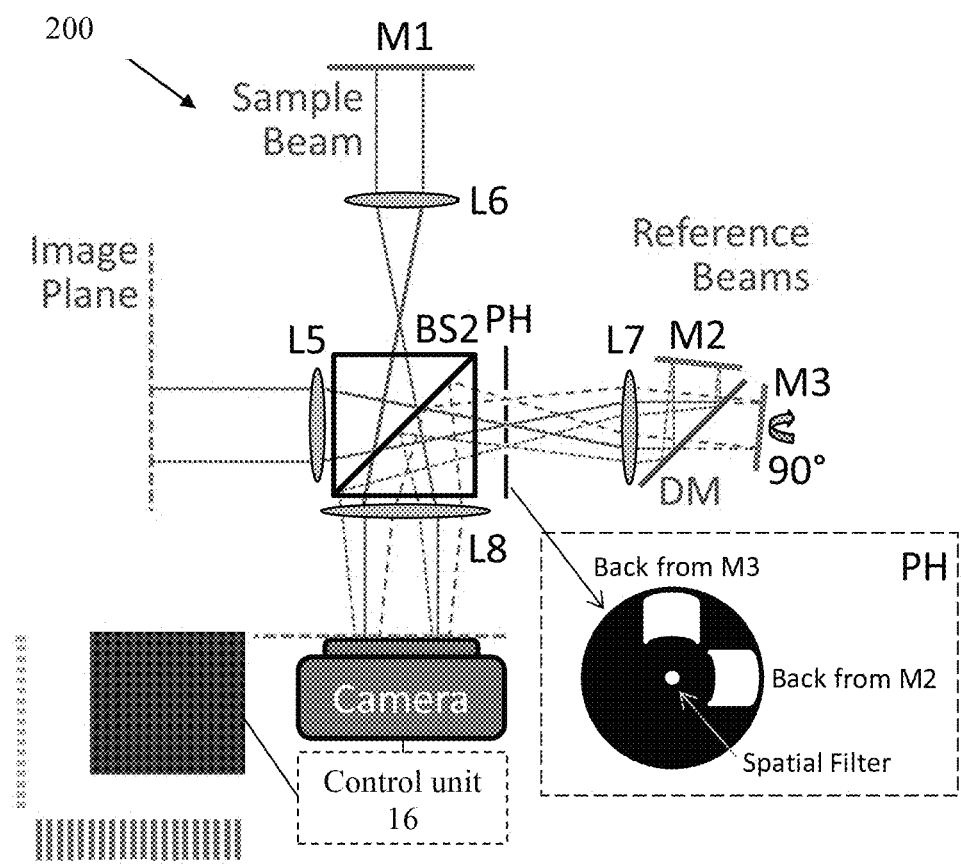

FIG. 1C illustrates a possible configuration of the interferometric module 200 of the present invention. In some embodiments, interferometric module 200 may be implemented as an external dual-wavelength interferometric module based on off-axis interferometric multiplexing providing two-wavelength phase unwrapping. In this specific and non-limiting example, the beam is Fourier transformed by lens L5 (e.g. f=160 mm), while being split into sample and reference beams by beam splitter BS2. The sample beam is then Fourier transformed by lens L6 (e.g. f=75 mm), reflected by mirror M1, and projected onto the detector e.g. monochrome camera (DCC1545M, Thorlabs) through lenses L6 and L8 (e.g. f=200 mm), so that the image-plane complex wave front of the modulated beams are projected onto the detector from both wavelength channels at once. Lenses L5, L6, L7 and L8 may form a Fourier optics assembly configured for simultaneously projecting at least two image-plane complex wave front modulated beams of each reference wavelength-separated beam onto the detector.

The detector is positioned to intercept the sample and reference beams along the detection plane, and is configured to generate a holographic representation of the sample based on the sample and reference beams, capturing the complex wave front of the sample, containing its complex wave front profile. The detector may be configured to apply an interferometric process (or may comprise a separate control unit 16 for applying the interferometric process) for generating the holographic representation of the complex wave front of the optical field from the sample. The detector may comprise a display configured to display one or more images of the holographic representation of the sample. As will be described below, the control unit 16 is configured and operable to receive from the detector a multiplexed interferogram composed of at least two fringe directions, each belonging to a different wavelength channel, and processing the multiplexed interferogram to provide at least two-wavelength phase unwrapping. Control unit 16 can extract from the multiplexed interferogram at least two wrapped phase profiles associated with at least two wavelength channels and provides a 3D height map of the sample and/or its spectral dependency. Control unit 16 may be comprised of a processor embedded therein running a computer program, or attached thereto. The computer program product may be embodied in one or more computer readable medium(s) having computer readable program code embodied thereon. The computer readable medium may be a computer readable signal medium or a computer readable storage medium. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). These computer program instructions may be provided to the processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The specified functions of the processor can be implemented by special purpose hardware-based systems that perform the specified functions or acts, or combinations of special purpose hardware and computer instructions.

In the reference beam arm of BS2, at the Fourier plane of lens L5, a spatial filter PH is positioned (e.g. made out of a 30 m pinhole), which has selected only the low-frequency spatial information of the image and effectively turned it into a reference beam [6]. Then, lens L7 (e.g. f=75 mm) is used to Fourier transform the beam back into the image domain, while spectrally separating the two-wavelength beam into its two wavelength channels using dichroic mirror DM (e.g. cut-off wavelength 593 nm, FF593-Di03, Semrock). Each of the wavelength channels are then back-reflected by slightly tilted mirrors, M2 and M3, and projected onto the detector at an off-axis angle through lenses L7 and L8. Lenses L1-L8 may be achromatic lenses. The relative angle between mirrors M2 and M3 may be selected such that each wavelength channel creates orthogonal off-axis interference fringe direction with respect to the other channel, and thus a single multiplexed off-axis hologram from the two wavelength channels can be recorded by the camera at a single exposure. As shown at the bottom inset of FIG. 1C, the spatial filter PH may comprise a plurality of openings (e.g. two off-axis holes may be drilled into the pinhole disk) to allow passage of the beams back-reflected reference beams from mirrors M2 and M3 to the detector. By having the same amount of lenses in the optical paths of the sample beam and reference beams, it was possible to create beam-path and beam-curvature matchings between the beams within the coherence length of the illumination source used. In this non-limiting example, the off-axis reference beams, implementing wavelength multiplexing, are reflected back in the image domain by using 90°-rotated titled mirrors.

Assuming that the first wavelength channel induces straight interference fringes across the x axis, and that the second wavelength channel induces straight interference fingers across the y axis, the multiplexed dual-wavelength interferogram, acquired by the monochrome camera in a single exposure is shown in FIG. 2A, and can be expressed as follows:

$$I(x,y) = I_{S1} + I_{R1} + \sqrt{I_{S1}I_{R1}} \cos[\phi_1(x,y) + x \cdot k_1 \sin(\alpha_1)] + I_{S2} + I_{R2} + \sqrt{I_{S2}I_{R2}} \cos[\phi_2(x,y) + y \cdot k_2 \sin(\alpha_2)], \quad (1)$$

where $I_{S1}$ and $I_{R1}$ are the sample and reference beam intensities, respectively, $\phi_1$ is the phase difference, and $k_1 \cdot \sin(\alpha_1)$ is the modulation term, comprised of wave number $k_1$ and the sine of the off-axis angle $\alpha_1$ between the sample and the reference beams, all for the first wavelength channel, and the same signs are valid for the second wavelength channel as well, but with a subscript of 2 instead of 1.

The control unit is configured to perform the following steps: the acquired multiplexed interferogram is 2D Fourier transformed digitally, and the power spectrum of the result is generated as shown in FIG. 2B. Since the multiplexed interferogram is composed of two orthogonal fringe directions, each of which belongs to another wavelength channel, the spectrum contains two pairs of fully separable cross-correlation terms. One term from each of the pairs can be cropped and processed according to conventional off-axis holography phase extraction, but on each cross-correlation term separately. Shortly, after an inverse 2D Fourier transform on the selected cross-correlation term, the associated sample complex wave-front is obtained. The angle argument of this complex matrix is the wrapped phase of the associated wavelength channel. Phase wrapping occurs due to the $2\pi$ periodic nature of the arctan function, which is used to extract the angle of the complex wave-front, and it restricts the optical thickness of the sample to be within one wavelength, in order to be directly deciphered. For continuous and smooth thickness objects, digital unwrapping algorithms can be applied to unwrap the phase. However, actual sharp phase discontinuities of over one wavelength would result in an error, or wrong interpretation of the phase map.

The two-wavelength phase retrieval method simplifies the digital process required and broadens the unambiguous phase range by processing the two phase profiles and creating another phase profile corresponding to a synthetic wavelength, which is much longer than any of the experimental wavelengths used.

In this case, for round-trip interaction with the sample, the extracted wrapped phases of each channel (marked with subscript 1 or 2) can be described as:

$$\phi_{1,2}(x, y) = 2 \cdot h(x, y) \cdot 2\pi \cdot \frac{1}{\lambda_{1,2}}, \quad (2)$$

where h(x, y) denotes the optical thickness of the sample and is extracted as follows:

$$\phi_\Lambda(x, y) = \phi_1(x, y) - \phi_2(x, y) = 2 \cdot h(x, y) \cdot 2\pi \cdot \left(\frac{\lambda_2 - \lambda_1}{\lambda_1 \lambda_2}\right). \quad (3)$$

$$h(x, y) = \frac{\phi_\Lambda(x, y)}{4\pi} \left(\frac{\lambda_1 \lambda_2}{\lambda_2 - \lambda_1}\right) = \frac{\phi_\Lambda(x, y)}{4\pi} \Lambda,$$

where the synthetic wavelength is given by $\Lambda = \lambda_1 \cdot \lambda_2/(\lambda_1 - \lambda_2)$. For instance, in the first case, where the central wavelengths are $\lambda_1 = 580$ nm and $\lambda_2 = 597$ nm, $\Lambda = 20{,}036$ nm is obtained. Following this subtraction, some phase jumps may be present due to wrapping spatial mismatch between both wrapped phase maps, which are resolved by adding $2\pi$ when the difference is negative [8].

In general, by using spectrally closer wavelengths, $\Lambda$ increases, allowing a broader unambiguous range, thus thicker objects may be imaged without phase unwrapping. Two problems prevent using closer spectral channels. The first is related to the nature of reflection-based interferometry. Interferometric systems with high-coherence illumination are usually easier to align. However, when considering a reflection-based interferometry system, any back-reflection from the various optical components in the system may result in parasitic interference patterns, which increases noise. Therefore, using spectrally broader illumination that still allows obtaining interference produces a shorter coherence length. This dictates a minimal spectral distance between both wavelength channels. The second problem is inherent to dual-wavelength interferometry in general. As described elsewhere [8], the technique does not only increase the synthetic wavelength, but also increases noise levels in a relation to that of $\Lambda$ and $\lambda_{1,2}$. For instance, in this case, the phase noise was about 35 times greater in the new synthetic-wavelength phase map.

Figures 3A, 3B, 3C, 3D, 3E:
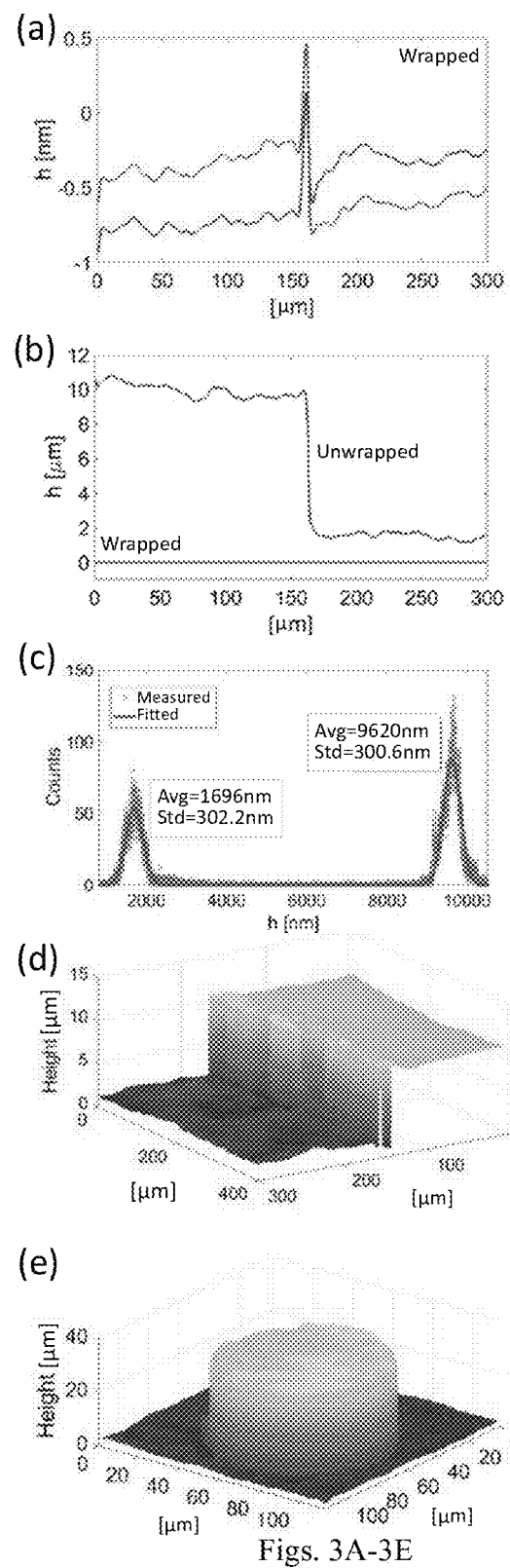
FIGS. 3A-3E show simultaneous two-wavelength phase unwrapping results obtained by using one possible implementation of the interferometric module of the present invention; in particular.

The off-axis interferometric module of the present invention was first tested for accuracy and precision by imaging a 7.96 μm step test target (SHS, Model #VDS-8.0QS, Bruker). Several different areas on the step were captured, and each measurement was repeated 20 times for repeatability analysis. Each interferogram was obtained and processed by using the sample inspection system of the present invention as described above. The nominal step value was 7.96 μm, as measured by commercial white-light interferometry (WLI) profiler (Contour GT, Bruker). FIGS. 3A-3E show simultaneous two-wavelength phase unwrapping results obtained by the off-axis interferometric module of the present invention. After imaging the step target with the off-axis interferometric module of the present invention in a single exposure, the wrapped phase profiles associated with each of the two-wavelength channels were extracted, the cross-sections of which are shown in FIG. 3A. FIG. 3A shows a two-wavelength phase profile cross-sections for a 7.96-μm-high step target. As seen in this figure, there is a steep jump at the step position, which cannot be simply solved with digital unwrapping algorithms, as verified on each phase profile separately. FIG. 3B shows the unwrapped phase cross-section, as obtained for the step target by using two-wavelength phase unwrapping. After applying the two-wavelength unwrapping method, the phase profile cross-section shown by the blue curve in FIG. 3B was obtained, where the previous cross-sections of the wrapped phase are shown at the bottom part of this figure, for reference. FIG. 3C shows a histogram of the height measurements for the step target. In particular, FIG. 3C shows the average values and the standard deviations of the two Gaussians curves obtained in the histogram of the height map. The step height was calculated as 7.92 μm from the difference of both averages. The average accuracy of the step height measurement (in relation to the reference WLI measurement) was between 10 and 60 nm, and the largest value in the system repeatability test (standard deviation over 20 frames) was 40 nm. As mentioned, spatial noise is amplified due to using synthetic wavelength, and in this case reached up to a maximum of 500 nm. This increased noise level problem, due to the synthetic wavelength, can be solved by algorithmic means [8]. FIG. 3D shows a height-map 3D rendering for the step target.

In order to further explore applicative feasibility of the system for optical metrology, a round copper pillars sample was measured. The pillars' nominal height was 30.5 μm and their diameter was 70 μm. In this case, the actual height and its deviation from the nominal value were measured, with a certainty of 7 μm. Thus, $\lambda_1$ and $\lambda_2$ were selected as 580 nm and 605 nm, respectively, producing a synthetic wavelength of 14.036 μm (approximately double 7 μm). Since the nominal height of the pillars was known, 4 full multiplications of $\lambda/2$ were added to the masked pillars to reach an unambiguous range of 7 μm around h=28 μm. FIG. 3E shows 3D rendering of the pillar-target (e.g. 30.5-μm-high copper pillar) height map. Overall, 26 pillars were measured, with an average height of 30.59 μm, and a standard deviation of 0.56 μm. The average distance from the nominal height was 0.45 μm.

Therefore, the present invention provides an off-axis interferometric module for simultaneous unwrapping of at least two wavelengths. The module can be used as a modular add-on to existing microscopic systems, and enables at least two-wavelength simultaneous imaging of objects, which are optically thicker than the illumination wavelength. In the measurements made by using the off-axis interferometer of the present invention, the accuracy obtained was better than 60 nm and repeatability was lower than 40 nm, over 20 measurements. These results are at the grade of commercial systems, and thus the off-axis interferometer module finds uses in metrology and 3D micro-topography imaging applications, especially for dynamic samples, when at least two-wavelength channels need to be acquired simultaneously. When more wavelength channels are available, some channels can be used to decrease noise created in the synthetic wavelength for phase unwrapping. Furthermore, optical spectroscopy and other applications that require interferometric simultaneous acquisition of several wavelengths may also use the novel interferometric module of the present invention.

Figure 4:
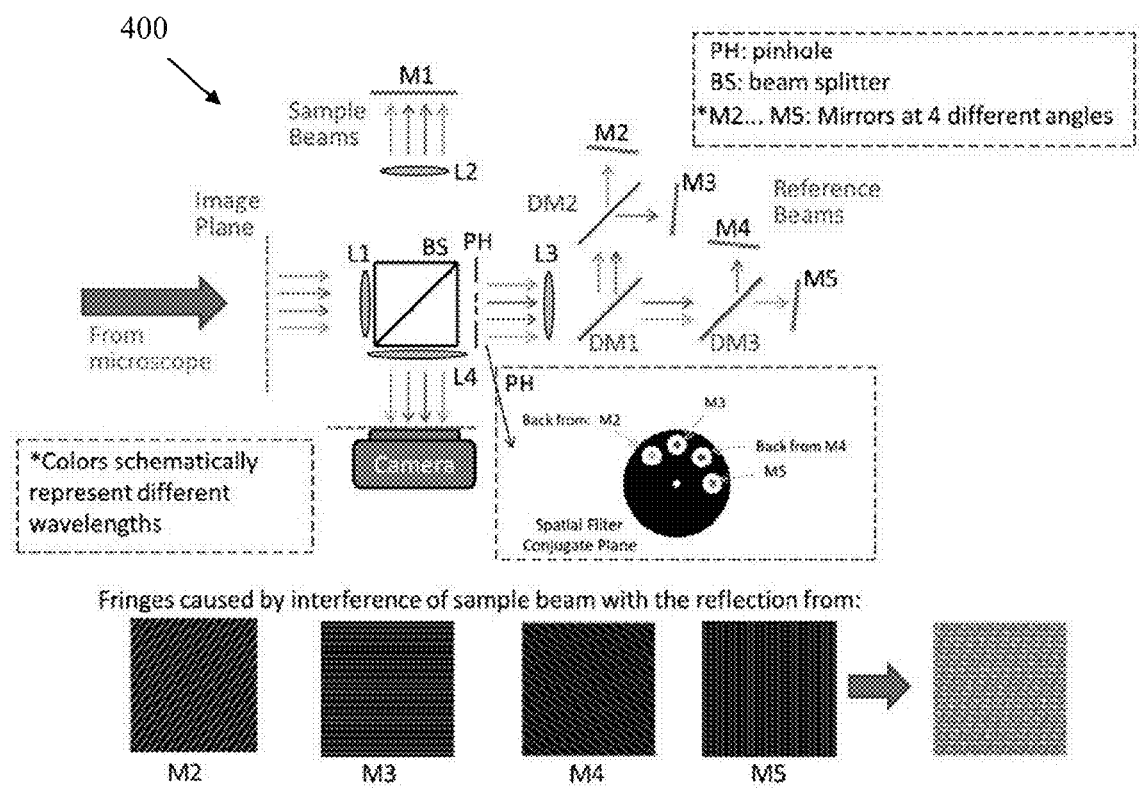
FIG. 4 is a schematic diagram of a possible configuration of an interferometric module in accordance with embodiments of the present disclosure.

FIG. 4 shows an example of a possible optical sample inspection system for multiplexing of four wavelength channels. As described above with respect to FIG. 1C, interferometric module 400 may be implemented as an external dual-wavelength interferometric module based on off-axis interferometric multiplexing providing four-wavelength phase unwrapping. In this specific and non-limiting example, the beam is Fourier transformed by lens L1, while being split into sample and reference beams by beam splitter BS. The sample beam is then Fourier transformed by lens L2, reflected by mirror M1, and projected onto the detector through lenses L4 so that the image-plane complex wave front of the modulated beams are projected onto the detector from both wavelength channels at once. Lenses L1, L2, L3 and L4 may form a Fourier optics assembly configured for simultaneously projecting four image-plane complex wave front modulated beams of each reference wavelength-separated beam onto the detector. In the reference beam arm of BS, at the Fourier plane of lens L1, a spatial filter PH is positioned, which has selected only the low-frequency spatial information of the image and effectively turned it into a reference beam [6]. Then, lens L3 is used to Fourier transform the beam back into the image domain, while spectrally separating the two-wavelength beam into its four wavelength channels using three dichroic mirrors DM1, DM2 and DM3. Each of the wavelength channels are then back-reflected by slightly four tilted mirrors, M2 and M3, and M4 and M5 and projected onto the detector at an off-axis angle through lenses L3 and L4. The relative angle between mirrors M2 and M3, and M4 and M5 may be selected such that each wavelength channel creates orthogonal off-axis interference fringe direction with respect to the other channel, and thus a single multiplexed off-axis hologram from the four wavelength channels can be recorded by the camera at a single exposure. The four mirrors M2, M3, M4 and M5 are positioned at different angles with respect to each other. As shown at the bottom inset of FIG. 4, the spatial filter PH may comprise a plurality of openings (e.g. four off-axis holes may be drilled into the pinhole disk) to allow passage of the beams back-reflected reference beams from mirrors M2, M3, M4, M5 to the detector. The spatial frequency domain with no overlap between the four channels is shown in FIG. 5C.

Figures 5A, 5B, 5C, 5D, 5E:
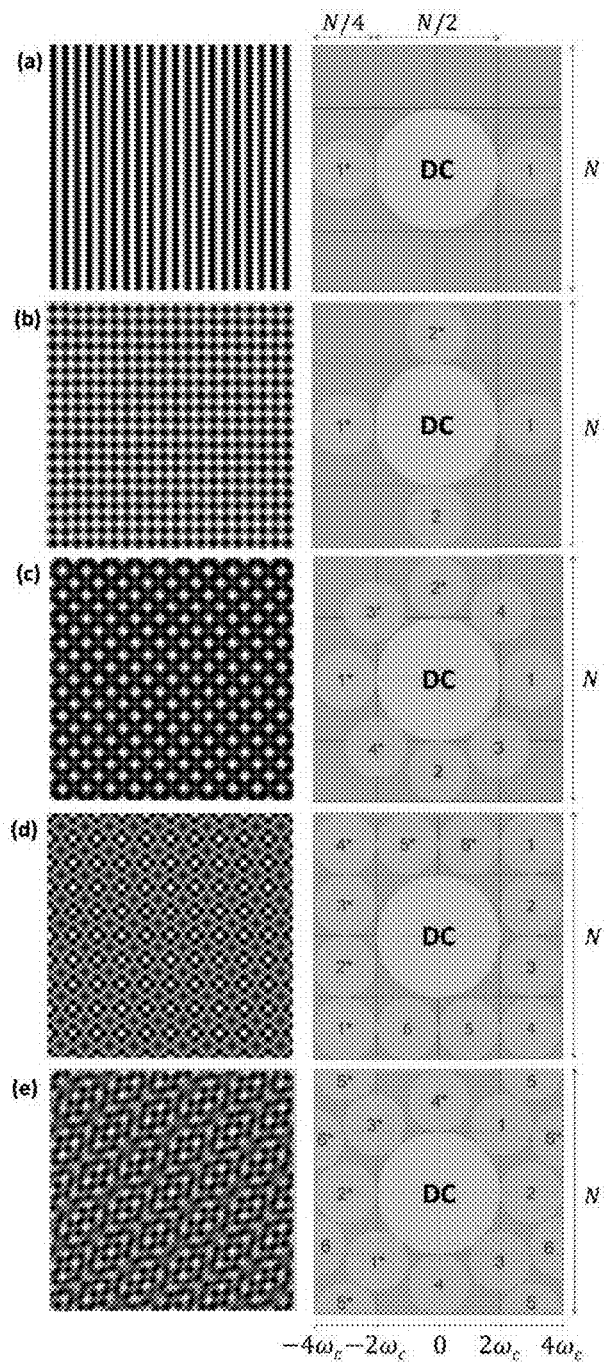
FIGS. 5A-5E are schematic illustrations of off-axis holograms (left) and the coinciding spatial frequency domains (right) for standard off-axis holography (FIG. 5A); multiplexing two off-axis holograms with orthogonal fringe directions (FIG. 5B); multiplexing four off-axis holograms (FIG. 5C); a first option for multiplexing six off-axis holograms (FIG. 5D); and a second option for multiplexing six off-axis holograms (FIG. 5E)

As described above, up to six wavelengths can be multiplexed without overlaps in the spatial frequency domain, as shown in FIG. 5E. Generally, it should be noted that off-axis holography uses a single sample beam and a single reference beam, which, in the spatial frequency domain, results in two auto-correlation terms located around the origin and two complex-conjugated cross-correlation terms located on both sides of the spatial frequency domain. Assuming that the maximum spatial frequency of the sample wave is $\omega_c$ on both axes, each of the cross-correlation terms occupies a spatial bandwidth capacity of $[-\omega_c, \omega_c]$, and the auto-correlation terms occupy a spatial bandwidth capacity of $[-2\omega_c, 2\omega_c]$ [7]. To avoid an overlap between the cross-correlation terms and the auto-correlation terms, the center of the spatial-frequency contents of the cross-correlation terms is shifted to at least $\pm 3\omega_c$ by adjusting the off-axis angle between the reference and sample beams, which requires a total spatial bandwidth of at least $8\omega_c$. However, for efficiency in using the spatial bandwidth of the camera and not wasting camera pixels, $8\omega_c$ should be used.

FIGS. 5A-5E show schematic illustrations of off-axis holograms (left) and the coinciding spatial frequency domains (right). In the spectra images, DC denotes the auto-correlation terms. The numbered circles around it denote the cross-correlation term, where the coinciding complex conjugate cross-correlation terms are denoted by a number and an asterisk. FIG. 5A shows an illustration of a standard off-axis holography. As shown in FIG. 5A, if the hologram and thus its spatial frequency plane have N×N pixels, the auto-correlation terms occupy N/2× N/2 pixels, and each of the cross-correlation terms occupies N/4× N/4 pixels [7]. In this case, the cross-correlation terms occupy 9.8% of the spatial frequency plane.

The off-axis holographic encoding typically creates an empty space in the spatial-frequency domain, into which other cross-correlation terms can be inserted encoding additional information on the sample. For example, FIG. 5B shows a multiplexed hologram with two orthogonal fringe directions that create two fully separable cross-correlation pairs in the spatial-frequency domain [2,13]. In this case, the cross-correlation terms occupy 19.6% of the spatial frequency plane. FIG. 5C shows a multiplexing of four off-axis holograms. Till now, it was accepted that one can multiplex up to four off-axis image holograms without overlap in the spatial frequency domain, as shown in FIG. 5C. In this case, the cross-correlation terms occupy 39% of the spatial frequency plane. The present invention provides two options of multiplexing six off-axis holograms without overlap in the spatial frequency domain shown in FIGS. 5D-5E. As shown in these figures, it is possible to position six cross-correlation terms in the spatial frequency domain without overlapping with each other and without overlapping with the auto-correlation terms. In both options, the total spatial frequency bandwidth capacity is $[-4\omega_c, 4\omega_c]$, and each cross-correlation term occupies a spatial frequency bandwidth capacity of $[-\omega_c, \omega_c]$. In FIG. 5E only, due to the cyclic property of discrete Fourier transform, each cross-correlation term that moves out of the spatial Fourier domain appears on the other side of this domain, on both axes.

Figure 6:
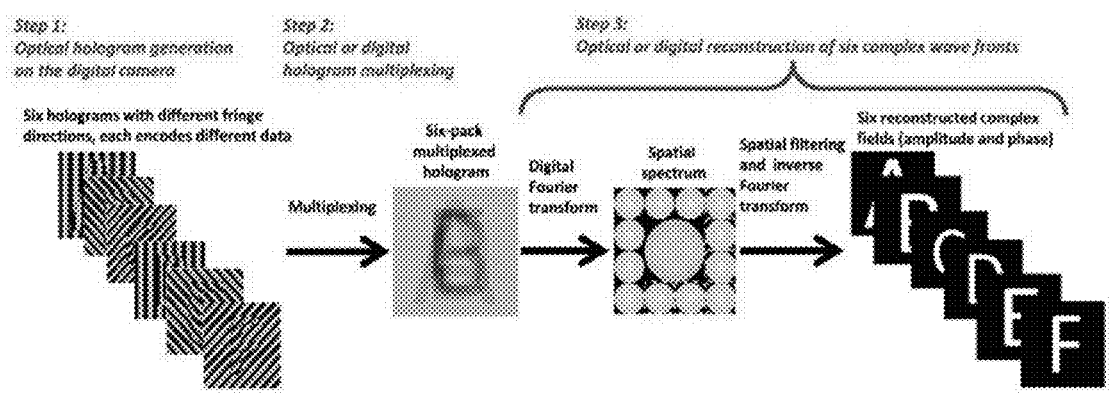
FIG. 6 is a schematic illustration of the multiplexing method according to some embodiments of the present invention.

FIG. 6 presents a scheme of an example of the entire multiplexing process. In step 1, off-axis holograms are acquired on the digital camera. In step 2, the six holograms are multiplexed. If optical multiplexing is performed, six sample and reference beam angle combinations are projected onto the digital camera at once, so that each combination creates straight off-axis fringes in a different direction, and each fringe direction yields a different cross-correlation pair in the spatial frequency domain that does not overlap with any of the other five cross-correlation pairs. The multiplexed hologram encodes six complex wave fronts, but it contains real numbers only (representing intensity of an interference pattern) and no complex numbers, and it can be sent or stored in its compressed version when needed. As described above, the technique of the present invention allows the cross-correlation terms to occupy 59% of the spatial frequency plane; thus more than 50% improvement compared to four hologram multiplexing. The technique of the present invention thus presents optimized camera space-bandwidth product usage for off-axis holography that allows optical off-axis hologram multiplexing where the auto-correlation terms are simultaneously acquired. Step 3 of FIG. 6 presents the reconstruction of the six complex wave fronts encoded into the multiplexed hologram. This reconstruction step can be performed digitally in the control unit, or optically by displaying the multiplexed hologram on a spatial light modulator and projecting the six reconstructed wave fronts.

The invention claimed is:

1. An off-axis interferometric module comprising a light directing optical arrangement for directing light to an optical detector, wherein the light directing optical arrangement is configured for defining at least two substantially overlapping optical paths towards the optical detector, the light directing optical arrangement comprising:
    at least one wavelength selective filter, configured for receiving a multiple-wavelength light beam having a modulated complex wave front and having at least two spectral bandwidths and separating the multiple-wavelength modulated beam into at least two wavelength-separated beams, each defining N different wavelength channels;
    at least two reflecting surfaces defining a certain angle with respect to each other and positioned at the output of said wavelength selective filter; each reflecting surface being configured for receiving and rotating each wavelength-separated beam of each wavelength channel at a certain angle and back reflecting each wavelength-separated beam towards the detector through a beam combiner being configured for receiving and combining reflections of each wavelength-separated beam with a reference beam to produce at least two output combined beams propagating along said at least two substantially overlapping optical paths; said at least two output combined beams being thereby at least two off-axis overlapping interferograms to be optically multiplexed into a single off-axis interferogram, containing interference fringe orientation in different directions.

2. The off-axis interferometric module of claim 1, further comprising the optical detector for simultaneously acquiring the at least two off-axis overlapping interferograms each at a different wavelength comprising an interference pattern resulting from interaction of the reference beam and at least one wavelength separated in the image plane being thereby indicative of said modulated complex wave front, such that said interferometric module is configured and operable to reconstruct the sample phase profile using a single interferogram exposure.

3. The off-axis interferometric module of claim 1, further comprising a holographic element positioned upstream to said wavelength selective filter for receiving the multiple-wavelength modulated beam, and splitting the multiple-wavelength modulated beam into at least two multiple-wavelength modulated beams.

4. The off-axis interferometric module of claim 3, wherein said holographic element is selected from a beam splitter/combiner, a diffraction grating, a semi-transparent mirror, or a wavelength selective filter.

5. The off-axis interferometric module of claim 1, further comprising an additional reflective surface, positioned in a first optical path of the at least two substantially overlapping optical paths, downstream to the wavelength selective filter, for receiving the reference beam and reflecting the reference beam towards the detector.

6. The off-axis interferometric module of claim 1, further comprising a spatial filter, positioned in a second optical path of the at least two substantially overlapping optical paths downstream to the beam combiner for receiving from the beam combiner a multiple-wavelength modulated beam and spatially filtering the multiple-wavelength modulated beam to thereby create a reference multiple-wavelength modulated beam.

7. The off-axis interferometric module of claim 6, wherein said spatial filter comprises a pinhole and is configured to include a plurality of openings for allowing passage of back reflected reference beams.

8. The off-axis interferometric module of claim 1, wherein N is an integer number having a value between two to six.

9. The off-axis interferometric module of claim 1, wherein said at least one wavelength selective filter comprises a number N−1 of wavelength selective filters.

10. The off-axis interferometric module of claim 1, wherein said at least two reflecting surfaces comprises two 90°-rotated titled mirrors such that each wavelength channel creates an orthogonal off-axis interference fringe direction with respect to the other wavelength channel.

11. A sample inspection system, comprising:
a light collecting and focusing optics configured and operable for collecting an input beam from a predetermined sample surface and focusing it onto an image plane;
a light source illuminating the sample surface; and
an off-axis interferometric module accommodated in a path of the light collected by the light collecting and focusing optics, and being connected at the output of the light collecting and focusing optics; the off-axis interferometric module being as defined in claim 1.

12. The sample inspection system of claim 11, wherein said light collecting and focusing optics comprises a microscope.

13. The sample inspection system of claim 11, wherein said off-axis interferometric module comprising a light directing optical arrangement for directing light to an optical detector is positioned to locate an image plane of said off-axis interferometric module on the detector such that the multiplexed interferogram contains at least two overlapping images acquired simultaneously in a single detector exposure.

14. The sample inspection system of claim 11, comprising a control unit configured and operable to receive from the detector a multiplexed interferogram composed of at least two fringe directions, each belonging to a different wavelength channel, and processing said multiplexed interferogram to provide at least two-wavelength phase unwrapping.

15. The sample inspection system of claim 14, wherein said control unit extracts from said multiplexed interferogram at least two wrapped phase profiles associated with at least two wavelength channels.

16. The sample inspection system of claim 14, wherein said control unit provides a 3D height map of the sample and/or its spectral dependency.

17. A method for multiple wavelength multiplexing comprising:
separating a multiple-wavelength beam being indicative of an image of a sample and having at least two spectral bandwidths into at least two wavelength-separated beams, each defining N different wavelength channels;
creating a reference multiple-wavelength modulated beam and rotating each wavelength-separated beam of each wavelength channel at a certain angle and reflecting each wavelength-separated beam with an off-axis angle on a detector;
simultaneously projecting at least two image plane amplitude and phase modulated beams of each wavelength-separated beam onto a detector;
combining reflections of each wavelength-separated beam with a reference multiple-wavelength modulated beam to produce at least two output combined beams propagating along at least two substantially overlapping optical paths; said at least two output combined beams being thereby at least two off-axis overlapping interferograms to be optically multiplexed into a single off-axis interferogram containing interference fringe orientation in different directions; and
acquiring a single multiplexed interferogram simultaneously from at least two wavelength channels in a single detector exposure.

18. The method of claim 17, comprising splitting the multiple-wavelength beam into first and second multiple-wavelength modulated beams spatially filtering a multiple-wavelength modulated beam to thereby create a reference multiple-wavelength beam with respect to the first multiple-wavelength modulated beam and reflecting said first multiple-wavelength modulated beam towards a detector.

19. The method of claim 17, comprising simultaneously acquiring up to six off-axis interferograms, each at a different wavelength.

20. The method of claim 19, comprising controlling the off-axis interference by controlling at least one of interfering wave angles by the position of optical elements, configured for rotating each beam of the wavelength channels.

21. The method of claim 17, comprising creating different interference fringe direction between at least two wavelength channels, without overlap in the spatial-frequency domain.

22. The method of claim 17, comprising illuminating a sample surface with an illumination beam having at least two spectral bandwidths.

23. The method of claim 17, comprising collecting an input beam from a predetermined sample surface and projecting it onto an image plane.

* * * * *